(12) United States Patent
Ma et al.

(10) Patent No.: US 11,928,550 B2
(45) Date of Patent: Mar. 12, 2024

(54) METHODS AND APPARATUS TO LOCATE AND DECODE AN ARRANGED PLURALITY OF BARCODES IN AN IMAGE

(71) Applicant: ZEBRA TECHNOLOGIES CORPORATION, Lincolnshire, IL (US)

(72) Inventors: Peizheng Ma, East Setauket, NY (US); Eugene B. Joseph, Coram, NY (US); Duanfeng He, South Setauket, NY (US); Miroslav Trajkovic, Setauket, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/587,489

(22) Filed: Jan. 28, 2022

(65) Prior Publication Data

US 2023/0244891 A1 Aug. 3, 2023

(51) Int. Cl.
*G06K 7/14* (2006.01)

(52) U.S. Cl.
CPC ......... *G06K 7/1443* (2013.01); *G06K 7/1417* (2013.01); *G06K 7/1452* (2013.01); *G06K 7/1482* (2013.01)

(58) Field of Classification Search
CPC .. G06K 7/1443; G06K 7/1417; G06K 7/1452; G06K 7/1482
See application file for complete search history.

(56) References Cited

U.S. PATENT DOCUMENTS

| 5,481,098 | A  | * | 1/1996  | Davis   | G06K 7/14 |
|           |    |   |         |         | 235/462.07 |
| 9,501,680 | B2 | * | 11/2016 | Hu      | G06K 7/1417 |
| 10,198,648| B1 | * | 2/2019  | Bradley | H04N 19/44 |
| 10,509,934| B1 | * | 12/2019 | Reynolds| G06K 7/1434 |
| 10,853,611| B1 | * | 12/2020 | Cheng   | G06K 7/1417 |
| 11,030,431| B2 | * | 6/2021  | Lei     | G06K 7/1452 |
| 11,188,727| B1 | * | 11/2021 | Lloyd   | G06K 7/015 |

(Continued)

OTHER PUBLICATIONS

International Search Report and Written Opinion for International Application No. PCT/US2023/11537 dated Apr. 18, 2023.

*Primary Examiner* — Daniel I Walsh
(74) *Attorney, Agent, or Firm* — Yuri Astvatsaturov

(57) ABSTRACT

Methods and apparatus to locate and decode an arranged plurality of barcodes in an image are disclosed. An example method includes obtaining image data representing an image of an environment appearing within a FOV of an imaging device that includes the image sensor, wherein an arranged plurality of barcodes appear in the image. A first subset of the plurality of barcodes is decoded from the image data. One or more parameters representing a predicted arrangement of the plurality of barcodes in the image is determined based upon location information associated with each of the decoded first subset of the plurality of barcodes. Possible locations for respective ones of a second subset of the plurality of barcodes are determined based upon the one or more parameters, and the second subset of the plurality of barcodes are attempted to be decoded from the image data in vicinities of the respective possible locations.

20 Claims, 12 Drawing Sheets

(56) References Cited

U.S. PATENT DOCUMENTS

| | | | |
|---|---|---|---|
| 2003/0127518 A1* | 7/2003 | Park | G06K 7/14 235/462.25 |
| 2004/0062443 A1* | 4/2004 | Yen | G06K 7/14 382/209 |
| 2010/0033086 A1* | 2/2010 | Mikami | C08L 65/00 313/504 |
| 2010/0044439 A1* | 2/2010 | Lee | G06K 7/10861 235/462.08 |
| 2011/0075931 A1* | 3/2011 | Chiou | G06K 7/1465 382/190 |
| 2011/0155808 A1* | 6/2011 | Santos | G06K 7/146 235/462.15 |
| 2011/0290877 A1* | 12/2011 | Sun | G06K 7/14 235/436 |
| 2012/0048937 A1* | 3/2012 | Dahari | G06K 7/10 235/462.25 |
| 2013/0341401 A1* | 12/2013 | Kannan | G06K 7/10881 235/462.08 |
| 2015/0001303 A1* | 1/2015 | Adams, Jr. | G06V 10/44 235/462.08 |
| 2015/0363619 A1* | 12/2015 | Lei | G06K 7/10732 235/455 |
| 2016/0188946 A1* | 6/2016 | Todeschini | G06K 7/1443 235/462.08 |
| 2017/0293788 A1* | 10/2017 | Taira | G06V 30/142 |
| 2018/0089511 A1* | 3/2018 | Tsuchimochi | G06V 10/225 |
| 2018/0112093 A1* | 4/2018 | Cai | C09K 11/7773 |
| 2019/0164001 A1* | 5/2019 | Wan | G06F 9/4881 |
| 2020/0017317 A1* | 1/2020 | Yap | B25J 9/1612 |
| 2020/0019743 A1* | 1/2020 | Lei | G06K 7/1452 |
| 2020/0302135 A1* | 9/2020 | Nirmala | G06K 7/1413 |
| 2021/0312217 A1* | 10/2021 | Nater | G06K 7/1408 |
| 2021/0326548 A1* | 10/2021 | Merlo | G06K 7/10722 |
| 2023/0043615 A1* | 2/2023 | Saitoh | G07G 1/01 |
| 2023/0102634 A1* | 3/2023 | Gururaja | G06T 7/11 382/173 |
| 2023/0128240 A1* | 4/2023 | He | G06V 20/20 235/462.09 |
| 2023/0244891 A1* | 8/2023 | Ma | G06K 7/14 235/462.09 |
| 2023/0274114 A1* | 8/2023 | Ma | G06K 7/1478 235/462.09 |

* cited by examiner

METHODS AND APPARATUS TO LOCATE AND DECODE AN ARRANGED PLURALITY OF BARCODES IN AN IMAGE

BACKGROUND

An image may contain a large number of barcodes that a barcode decoder is supposed to locate and decode. Under such circumstances, the location and decoding of the barcodes may be slow as the barcode decoder searches throughout the image for all possible barcode locations, and then tries, potentially with multiple possible sets of barcode decoding parameters, to decode a barcode at each possible barcode location.

SUMMARY

To reduce or eliminate some or all of these, or other problems of conventional barcode decoding, example methods, apparatus, and articles of manufacture to locate and decode an arranged plurality of barcodes in an image are disclosed.

In an embodiment, the present invention is a method comprising: obtaining, from an image sensor, image data representing an image of an environment appearing within a field of view of an imaging device that includes the image sensor, wherein an arranged plurality of barcodes appear in the image; decoding a first subset of the plurality of barcodes from the image data; determining, based upon location information associated with each of the decoded first subset of the plurality barcodes, one or more parameters representing a predicted arrangement of the plurality of barcodes in the image; determining, based upon the one or more parameters, possible locations for respective ones of a second subset of the plurality of barcodes, wherein the second subset excludes the first subset; and attempting to decode the second subset of the plurality of barcodes from the image data in vicinities of the respective possible locations.

In a variation of this embodiment, the plurality of barcodes are on respective ones of a plurality of objects in the environment, and the possible locations represent possible locations of the plurality of objects.

In a variation of this embodiment, wherein attempting to decode the second subset of the plurality of barcodes uses first a set of decoding parameters used to successfully decode one or more of the first subset of the plurality of barcodes.

In a variation of this embodiment, the method further comprises: using a first barcode decoding algorithm prioritized for speed over read rate to decode the first subset of the plurality of barcodes; and using a second barcode decoding algorithm prioritized for read rate over speed to attempt to decode the second subset of the plurality of barcodes.

In a variation of this embodiment, the method further comprises: determining, based upon the location information associated with each of the decoded first subset of the plurality of barcodes and second location information associated with each successfully decoded barcode of the second subset of the plurality of barcodes, second one or more parameters representing a second predicted arrangement of the plurality of barcodes in the image; determining, based upon the second one or more parameters, estimated second possible locations for respective ones of a third subset of the plurality of barcodes; and attempting to decode the third subset of the plurality of barcodes from the image data in vicinities of the second possible locations.

In a variation of this embodiment, the method further comprises: identifying a subset of the possible locations at which a barcode was not successfully decoded; and processing image data associated with each of the subset of the possible locations to confirm that a barcode is not present at or near the subset of the respective estimated locations.

In a variation of this embodiment, processing the image data associated with each of the subset of the possible locations to confirm that a barcode is not present comprises attempting to decode a barcode using image data further away from each of the subset of the possible locations with a substantially exhaustive set of barcode decoding parameters.

In a variation of this embodiment, the arrangement is based upon a rectangular grid.

In a variation of this embodiment, the arrangement is based upon a rectangular grid, and determining, based upon the location information, the one or more parameters comprises: determining, based upon the location information, a logical rectangular bounding box that logically encompasses the plurality of barcodes; projecting logical lines from centers of the decoded first subset of the plurality of barcodes, the logical lines projected to be substantially perpendicular to edges of the logical rectangular bounding box; and determining the one or more parameters to represent intersections of the logical lines.

In a variation of this embodiment, the one or more parameters represent possible locations of the plurality of barcodes in the arrangement, and determining the possible locations for respective ones of the second subset of the plurality of barcodes comprises: identifying a subset of the possible locations that excludes locations associated with the decoded first subset of the plurality of barcodes; and determining the possible locations to represent the locations of the subset of possible locations.

In a variation of this embodiment, the arrangement is based upon a rectangular grid, and determining, based upon the location information, the one or more parameters comprises: determining, based upon a number of the plurality of barcodes and the location information, one or more dimensions of the grid; subdividing the grid, based upon the number of the plurality of barcodes, to identify vertices of the grid; and determining the one or more parameters to represent locations of the vertices.

In another embodiment, the present invention is a method comprising: obtaining, from an image sensor, image data representing an image of an environment appearing within a field of view of an imaging device that includes the image sensor, wherein an arranged plurality of barcodes appear in the image; computing a horizontal projection of the image data by computing a plurality of sums across respective rows of the image data; computing a vertical projection of the image data by computing a plurality of sums across respective columns of the image data; identifying first regions of the horizontal projection corresponding to respective rows of barcodes; identifying second regions of the vertical projection corresponding to respective columns of barcodes; determining one or more parameters representing a predicted arrangement of the plurality of barcodes based upon overlaps of the first regions and the second regions; determining, based upon the one or more parameters, possible locations for respective ones of the barcodes; and attempting to decode the barcodes from the image data in vicinities of the possible locations.

In yet another embodiment, the present invention is an apparatus comprising an interface and a barcode decoder. The interface is configured to receive, from an image sensor, image data representing an image of an environment appearing within a field of view of the image sensor, wherein an arranged plurality of barcodes appear in the image. The barcode decoder is configured to: decode a first subset of the plurality of barcodes from the image data; determine, based upon location information associated with each of the decoded first subset of the plurality of barcodes, one or more parameters representing a predicted arrangement of the plurality of barcodes in the image; determine, based upon the one or more parameters, possible locations for respective ones of a second subset of the plurality of barcodes, wherein the second subset excludes the first subset; and attempt to decode the second subset of the plurality of barcodes from the image data in vicinities of the respective possible locations.

In a variation of this embodiment, the plurality of barcodes are on respective ones of a plurality of objects in the environment, and the possible locations represent possible locations of the plurality of objects.

In a variation of this embodiment, the barcode decoder is configured to: use a first barcode decoding algorithm prioritized for speed over read rate to decode the first subset of the plurality of barcodes; and use a second barcode decoding algorithm prioritized for read rate over speed to attempt to decode the second subset of the plurality of barcodes.

In a variation of this embodiment, the arrangement is based upon a rectangular grid.

In a variation of this embodiment, the arrangement is based upon a rectangular grid, and the barcode decoder is configured to determine, based upon the location information, the one or more parameters by: determining, based upon the location information, a logical rectangular bounding box that logically encompasses the plurality of barcodes; projecting logical lines from centers of the decoded first subset of the plurality of barcodes, the logical lines projected to be substantially perpendicular to edges of the logical rectangular bounding box; and determining the one or more parameters to represent intersections of the logical lines.

In still another embodiment, the present invention is a non-transitory, computer-readable, storage medium storing computer-readable instructions that, when executed by one or more processors, cause a barcode decoder to: obtain, from an image sensor, imaging data representing an image of an environment appearing within a field of view of the image sensor, wherein an arranged plurality of barcodes appear in the image; decode a first subset of the plurality of barcodes from the image data; determine, based upon location information associated with each of the decoded first subset of the plurality of barcodes, one or more parameters representing a predicted arrangement of the plurality of barcodes in the image; determine, based upon the one or more parameters, possible locations for respective ones of a second subset of the plurality of barcodes, wherein the second subset excludes the first subset; and attempt to decode the second subset of the plurality of barcodes from the image data in vicinities of the respective possible locations.

In a variation of this embodiment, the plurality of barcodes are on respective ones of a plurality of objects in the environment, and the possible locations represent possible locations of the plurality of objects.

In a variation of this embodiment, the instructions, when executed by one or more processors, cause the barcode decoder to: use a first barcode decoding algorithm prioritized for speed over read rate to decode the first subset of the plurality of barcodes; and use a second barcode decoding algorithm prioritized for read rate over speed to attempt to decode the second subset of the plurality of barcodes.

In a variation of this embodiment, the arrangement is based upon a rectangular grid, and the instructions, when executed by one or more processors, cause the barcode decoder to determine, based upon the location information, the one or more parameters by: determining, based upon the location information, a logical rectangular bounding box that logically encompasses the plurality of barcodes; projecting logical lines from centers of the decoded first subset of the plurality of barcodes, the logical lines projected to be substantially perpendicular to edges of the logical rectangular bounding box; and determining the one or more parameters to represent intersections of the logical lines.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
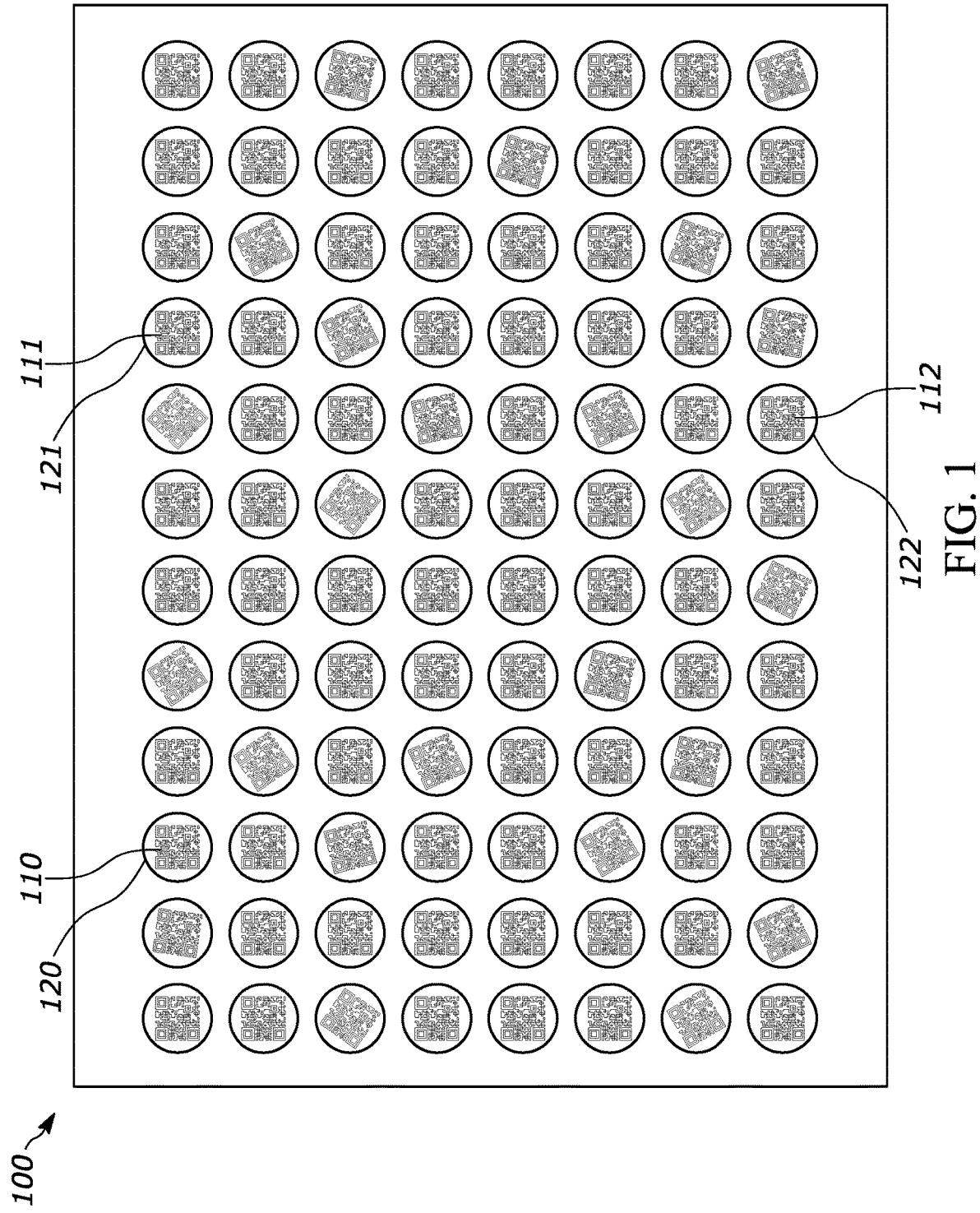
FIG. 1 is an example image of an arranged plurality of barcodes for decoding.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

There are specialized applications of barcode decoding, such as inspection, in which an image contains an arranged plurality of barcodes (e.g., hundreds). For example, the image may contain a plurality of objects arranged according to a substantially fixed arrangement, such as a grid, a line, a circle, or the like, with each object having a barcode thereon. Accordingly, the plurality of barcodes are also arranged according to the fixed arrangement.

FIG. 1 is an example image 100 of an arranged plurality of two-dimensional (2D) barcodes for decoding (three of which are designated at reference numerals 110, 111, and 112) according to a fixed arrangement. In FIG. 1, the barcodes 110-112 are located on ends of respective specimen tubes 120, 121, and 122, where the tubes 120-122 are positioned in respective openings of a storage rack according to a fixed grid. In the example shown, the barcodes 110-112 are generally centered on the tubes 120-122 and, thus, are arranged according to the fixed grid.

Figure 2:
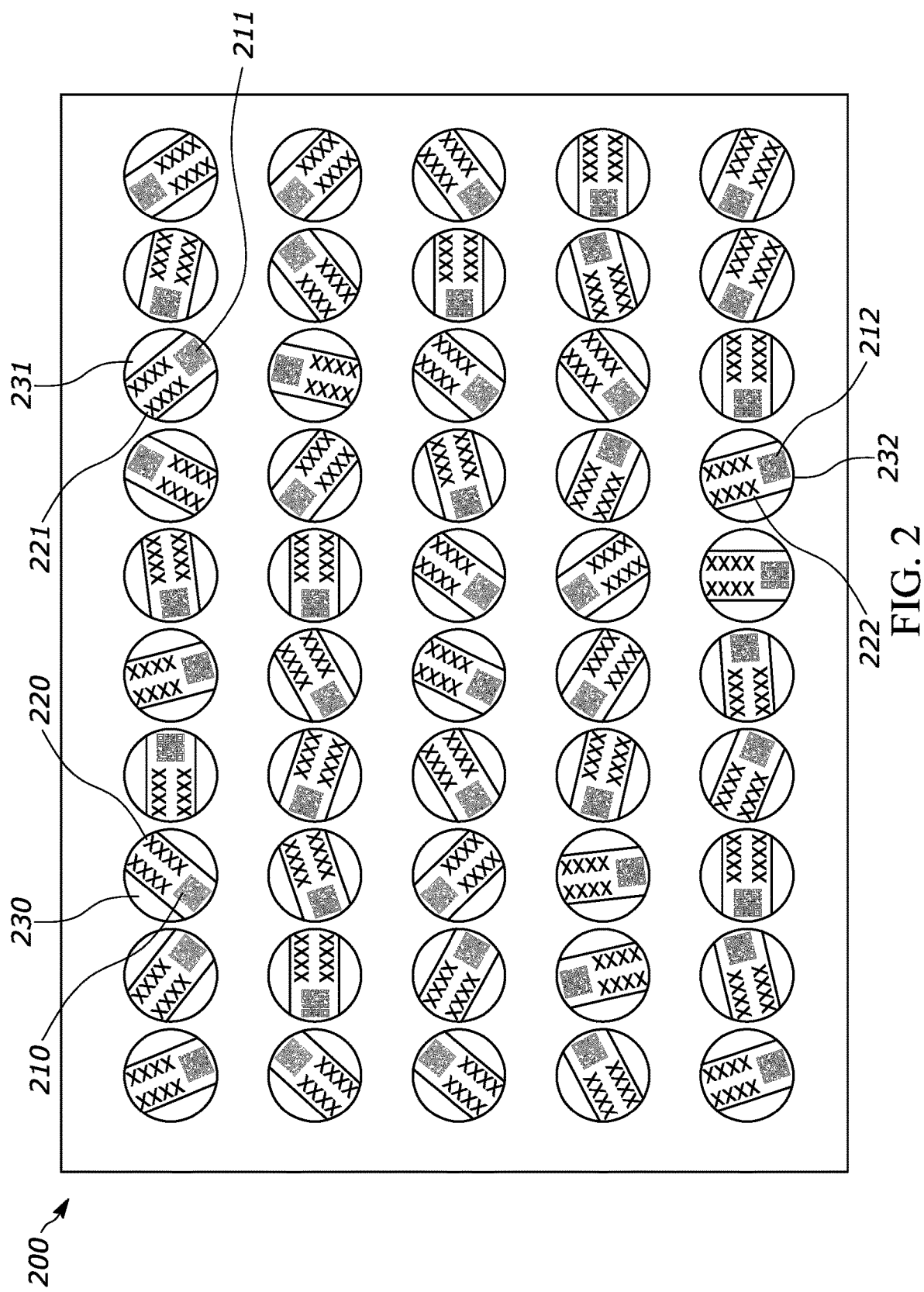
FIG. 2 is another example image of an arranged plurality of barcodes for decoding.

FIG. 2 is another example image 200 of an arranged plurality of 2D barcodes for decoding (three of which are designated at reference numerals 210, 211, and 212) according to a fixed arrangement. In FIG. 2, the barcodes 210-112 are printed on respective rectangular labels 220, 221, and 222 on respective ends of specimen tubes 230, 231, and 232, where the tubes 230-232 are positioned in respective openings of a storage rack according to a fixed grid. While in the example shown, the barcodes 210-112 are not centered on the tubes 230-232, they are, nevertheless, still considered herein to be arranged according to the arrangement of the fixed grid.

While example arrangements of barcodes are shown in FIGS. 1 and 2, and used as examples for explaining disclosed example methods and apparatus for locating and decoding an arranged plurality of barcodes in an image, one of ordinary skill in the art will recognize that barcodes may be arranged in other ways. For example, in lines, in circles, etc. Disclosed methods and apparatus for locating and decoding arranged barcodes may also be used with those and other arrangements. Moreover, while the examples shown and described include 2D barcodes, any other type(s) of arranged indicia (e.g., one-dimensional (1D) barcodes, direct product markings, etc.) may be located and decoded using the methods and/or apparatus disclosed herein. Furthermore, as shown in FIGS. 1 and 2, barcodes of an arranged plurality of barcodes may be rotated with respect to other barcodes of the plurality of barcodes. Further still, disclosed examples do not require that barcodes be precisely arranged, as image data in the vicinity of or near by a possible location instead of precisely at a possible location can be used to decode a barcode.

Applications associated with the locating and decoding of arranged barcodes may require successful decoding of substantially all barcodes present in an image (e.g., with a 100% read rate) in order for an application to operate as expected. That is, it may be required that substantially all barcodes present in an image are successfully located and decoded. However, typically, realizing such a read rate can be slow, as it can take a long time to locate all of the barcodes in an image.

It has been advantageously discovered that location information associated with each of a successfully decoded subset of the plurality of barcodes in an image during a first decoding pass can be used to determine or identify a predicted, estimated, or approximate arrangement of the plurality of barcodes. For clarity, the determined or identified arrangement will be referred to herein simply as a "predicted arrangement." The subset of barcodes is decoded using a decoding algorithm prioritized for speed over read rate, in some examples, such that the subset of barcodes can be quickly located and decoded. The predicted arrangement of the barcodes can then be used to quickly determine or identify possible, estimated, or approximate locations for the rest of the barcodes, such that the time required to locate the rest of the barcodes during a second decoding pass can be substantially reduced. For clarity, the determined or estimated locations will be referred to herein as simply "possible locations," or "possible barcode locations." The second barcode decoding pass starts decoding the remaining barcodes using image data at, nearby, or in vicinities of the possible locations, for example. Example possible locations include expected centers of barcodes, and/or expected centers of objects having barcodes thereon. It has been demonstrated that the time required to locate and decode a large number of barcodes (e.g., fifty) in an image can be reduced by over an order of magnitude (e.g., from 10 seconds to under 1 second) using the methods and apparatus disclosed herein. While disclosed examples can locate and decode an arranged plurality of barcodes in an image without a priori knowledge regarding the form, type, dimensions, etc. of the arrangements, it is contemplated that a priori information could be provided to a barcode decoder such that the barcode decoder can use such information in the determining or identifying of a predicted arrangement of the barcodes.

Reference will now be made in detail to non-limiting examples, some of which are illustrated in the accompanying drawings.

Figure 3:
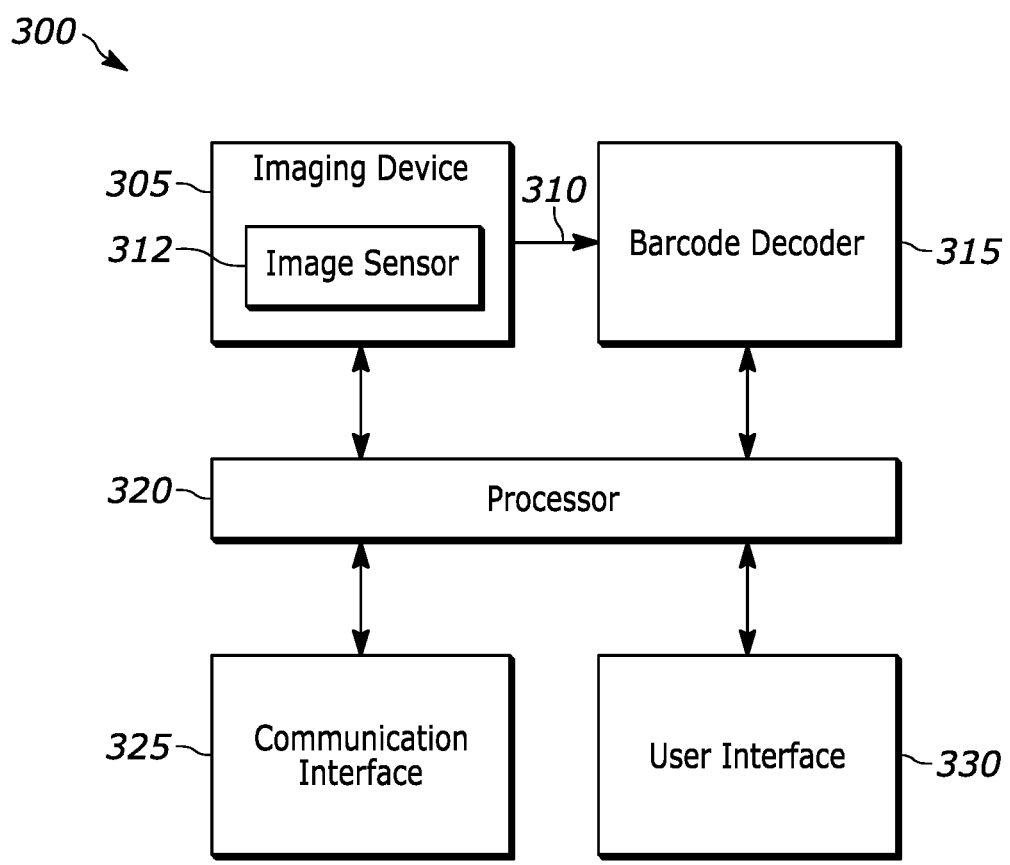
FIG. 3 is a block diagram of an example system for locating and decoding an arranged plurality of barcodes appearing in an image, in accordance with embodiments of the disclosure.

FIG. 3 illustrates an example system 300 for locating and decoding an arranged plurality of barcodes, such as the barcodes of the example images 100 and 200. The example system 300 includes any number and/or type(s) of example image devices 305 configured to capture images 310. The imaging device 305 captures, using an image sensor 312 having a plurality of photosensitive elements, image data representing an image 310 of an environment in which the system 300 is operating that falls within a field of view (FOV) the imaging device 305. Example image data includes data representing the outputs of the plurality of photosensitive elements, that is, the pixels of the image sensor 312.

The system 300 includes an example barcode decoder 315 configured to locate and decode an arranged plurality of barcodes appearing in an image 310 to determine the payload of the barcodes. The example barcode decoder 315, during a first decoding pass prioritized for speed over read rate, for example, decodes a first subset of the plurality of barcodes from the image data for a captured image 310. In some examples, the barcode decoder 315 attempts to decode all of the barcodes, but only successfully decodes the first subset. In some examples, the barcode decoder 315 identifies the first subset of barcodes as a subset of the barcodes that are spread out in the image. In some examples, the barcode decoder 315 attempts to decode a pre-determined number of barcodes (e.g., five to ten) sufficient to determine or identify a predicted arrangement of the plurality of barcodes.

The barcode decoder 315 can identify possible barcode locations during the first decoding phase using any number and/or type(s) of method(s), such as contrast detection, feature densities, etc. For example, the barcode decoder 315 can process blocks (e.g., 8 by 8, 16 by 16, or 32 by 32 pixel blocks) of the image data to determine a contrast for each block, and use the block contrasts to quickly identify possible barcode locations. Additionally and/or alternatively, the barcode decoder 315 can process the image data to identify features in the image data (e.g., lines, dots, corners, "L"s, etc.), and compute the number of features in blocks of the image data (e.g., feature densities), and use those feature densities to identify possible barcode locations.

Figure 4:
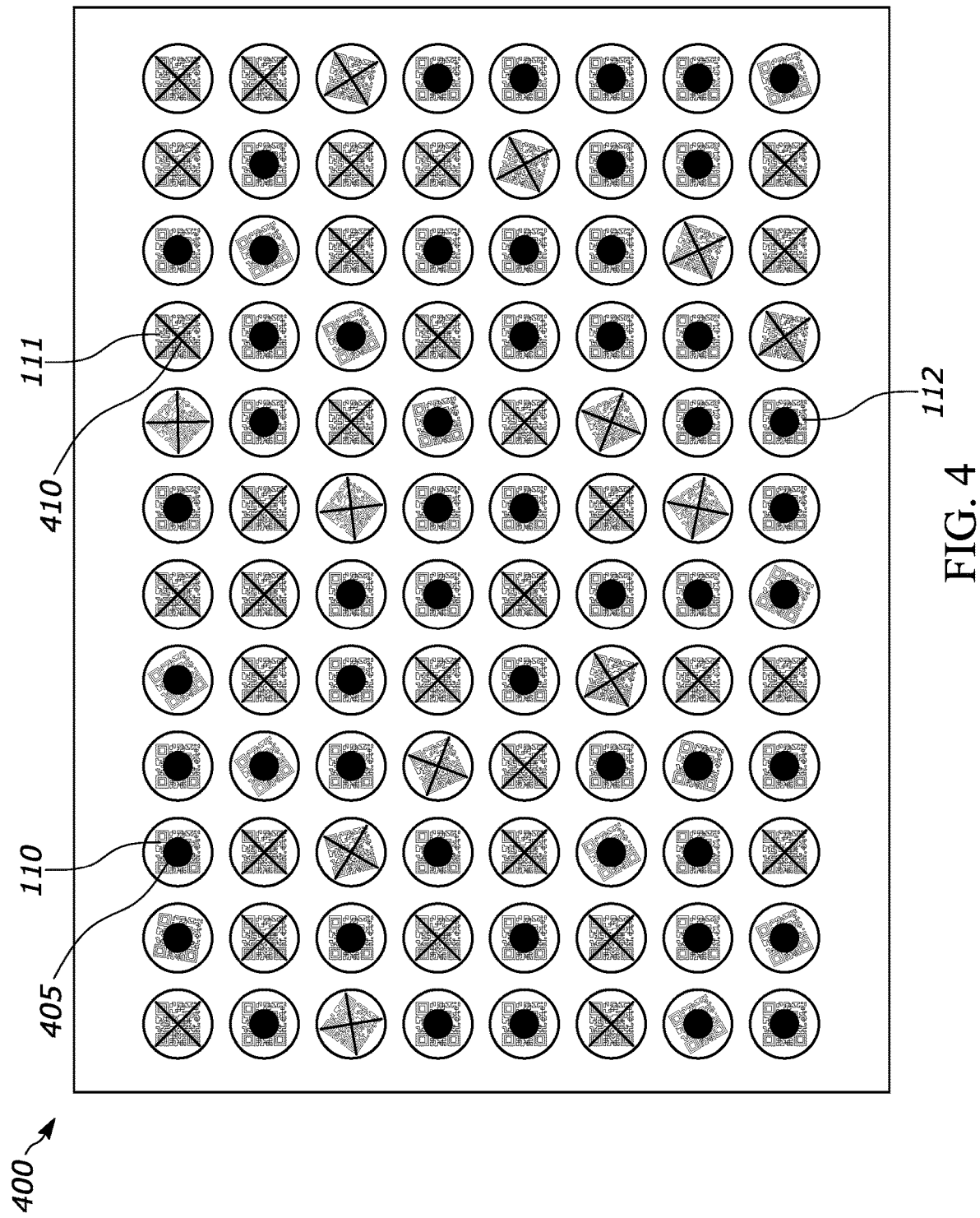
FIG. 4 is an example image depicting a version of the image of FIG. 1 annotated to identify a subset of the barcodes successfully decoded during a first decoding pass.

FIG. 4 is an example image 400 depicting a version of the image 100 of FIG. 1 annotated to identify a subset of the barcodes 110-112 that were successfully decoded by the barcode decoder 315 during a first decoding pass. The successfully decoded subset of the barcodes are annotated in FIG. 4 with a "dot" 405, while the rest or remaining barcodes are annotated with an "X" 410. For example, barcodes 110 and 112 were successfully decoded during the first decoding pass, and barcode 111 was not successfully decoded.

The barcode decoder 315 determines, based upon location information associated with each of the first subset of barcodes successfully decoded during the first decoding pass (e.g., the barcodes annotated with a dot 405 in FIG. 4), one or more parameters representing a predicted arrangement of the plurality of barcodes in the image 310. For an example grid-based arrangement, example location information represents centers of the decoded barcodes, and/or centers of objects having a decoded barcode thereon. In the latter case, the centers of the objects can be determined knowing the position of a barcode relative to a center of the object having the barcode thereon, as shown in FIG. 2. For example, knowing the position of a barcode 210-212 on a label 220-222 can be used to determine a center of the label 220-222 and, thus, an estimated or approximate center of an object 230-232 having the label 220-222 thereon.

Example parameters representing a predicted grid arrangement include pairs of coordinates representing each vertex of the grid arrangement. The vertices of grid can represent possible barcode locations, and/or possible, estimated, or approximate locations of objects having barcodes thereon. In some examples, the vertices of the grid are adjusted to be generally equally spaced apart. In some examples, for example when only a small number of barcodes are successfully decoding during the first decoding pass, additional possible, estimated, or approximate vertices may be added to fill in gaps in the predicted grid arrangement. Other example parameters representing a grid arrangement include an overall horizontal dimension, an overall vertical dimension, positions of each column, and positions of each row. In some examples, the column positions and the row positions are adjusted to be generally equally spaced apart.

Figure 5:
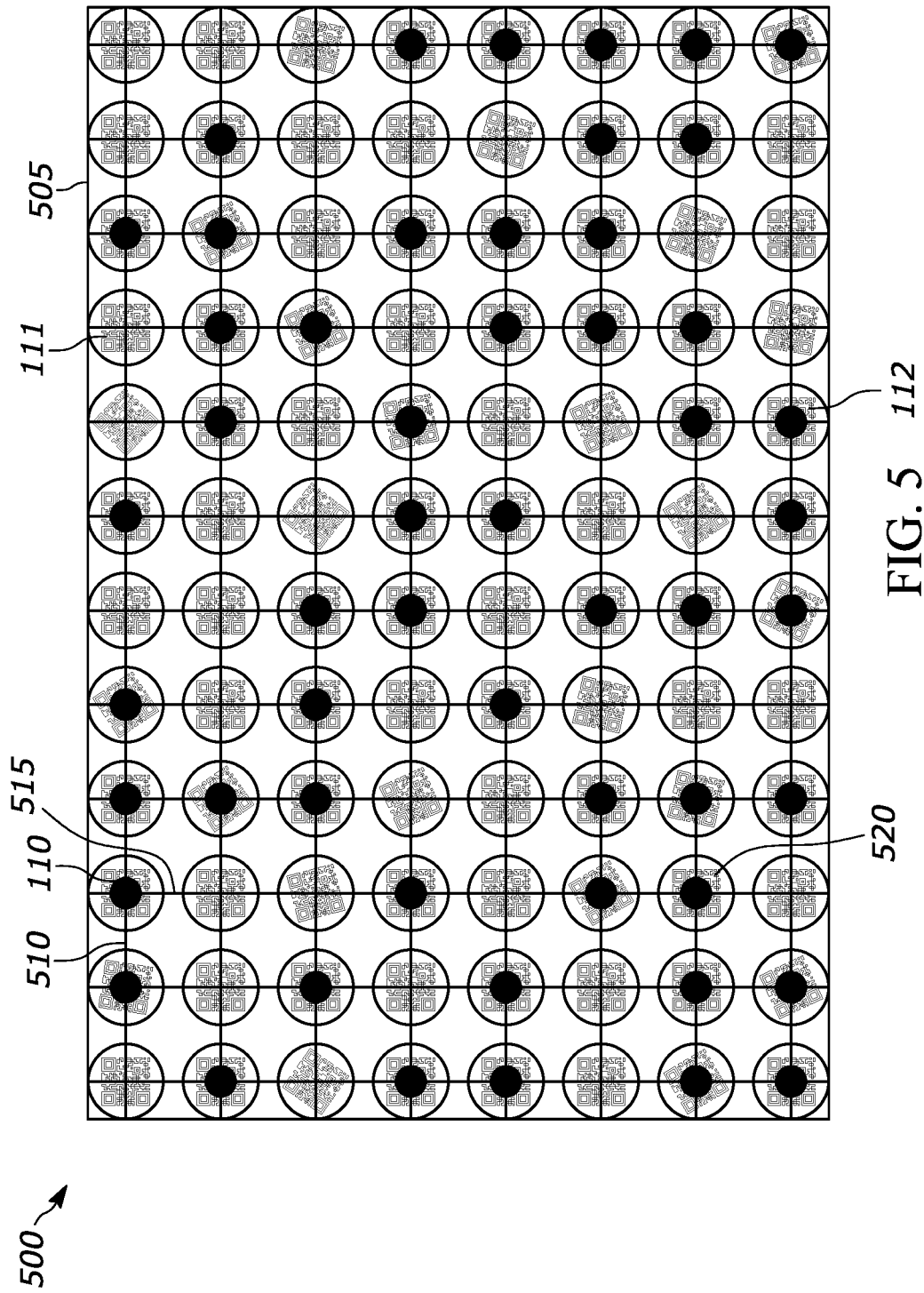
FIG. 5 is an example image depicting another version of the image of FIG. 1 including a barcode arrangement identified based upon the identified subset of barcodes of FIG. 4.

In an example, the barcode decoder 315 determines the one or more parameters representing a predicted arrangement by defining a logical rectangular bounding box 505 that logically encompasses the plurality of barcodes 110-112, as shown in FIG. 5. The barcode decoder 315 projects horizontal logical lines (one of which is designated at reference numeral 510 for barcode 110) and vertical logical lines (one of which is designated at reference numeral 515 for barcode 110) from centers of the decoded subset of barcodes, such that the logical lines are projected to be substantially perpendicular to edges of the logical rectangular bounding box 505, as shown. When there are multiple projecting lines associated with different decoded barcodes (e.g., the barcode 110 and a barcode 520) within a same row or column of the grid, the barcode decoder 315 can combine their lines into an aggregate line that represents, for example, a mean or average line. The barcode decoder 315 determines intersections of the logical lines and/or the aggregate lines as the vertices of the grid arrangement, and determines the one or more parameters to represent the vertices. The barcode decoder 315 determines a subset of the vertices that are not associated with barcodes successfully decoded during the first pass as possible locations for the rest of the barcodes, i.e., for a second subset of the plurality of barcodes.

In a second decoding pass, the barcode decoder 315 attempts to decode the second subset of barcodes from image data for the image 310 at, nearby, or in vicinities of the possible barcode locations. During the second decoding pass, the barcode decoder 315 uses a decoding algorithm prioritized for read rate over speed, in some examples. In some examples, a set of barcode decoding parameters used during the first decoding pass is used first during the second decoding pass to further accelerate the locating and decoding of barcodes. Example barcode decoding parameters include a pixels per module (PPM), a barcode format, a barcode width-to-height ratio, a limit of a contour walker steps, a barcode type, and an image resolution. An example set of barcode decoding parameters includes all parameters needed to decode a barcode. An example set of barcode decoding parameters includes at least a PPM, a barcode format, and an image resolution.

In some examples, the barcode decoder 315 repeats the process of determining the one or more parameters representing the predicted arrangement using both the location information associated with each of the barcodes successfully decoded during the first pass location, and information associated with each of barcodes successfully decoded during the second pass. The barcode decoder 315 can use the updated one or more parameters to determine further possible barcode locations at which to attempt to decode barcodes during a third decoding pass. In some examples, this process is only repeated when a barcode is not successfully decoded at one or more of the possible locations. In some examples, the process is only repeated once or twice. In some examples, further decoding based on an updated predicted arrangement during a third decoding pass is only performed when a change in the predicted arrangement satisfies an iteration criteria (e.g., at least one vertex moves by at least a predetermined number of pixels).

In some examples, when one or more barcodes were not successfully decoded using the above method(s), the barcode decoder 315 attempts to decode the unsuccessfully decoded barcodes using image data that is further away from the possible locations, and/or using additional possible sets of barcode decoding parameters. In this way, the barcode decoder 315 can more exhaustively verify that a barcode is not actually present in the image, such that a high read rate (e.g., 100%) can be achieved.

In another example, the barcode decoder 315 determines, based upon the number of barcodes in the arrangement, and the location information associated with each of the barcodes successfully decoded during the first pass location, one or more overall dimensions of the grid (e.g., horizontally and vertically), subdivides the one or more dimensions of the grid, based upon the number of barcodes in corresponding directions, to identify vertices of the grid, and determines the one or more parameters to represent locations of the vertices. The number of barcodes in the arrangement can be known a priori, and/or can be determined based on the barcodes decoded during the first decoding pass.

In yet another example, instead of decoding the first subset of barcodes and determining the arrangement based on the first subset of barcodes, the barcode decoder 315 computes one or more characteristics of an image, such as a horizontal projection of the image data for a captured image 310 by computing a plurality of sums across respective rows of the image data, and a vertical projection of the image data by computing a plurality of sums across respective columns of the image data. The barcode decoder 315 can identify one or more first regions of the horizontal projection corresponding to respective rows of barcodes, and one or more second regions of the vertical projection corresponding to respective columns of barcodes, and can determine the one or more parameters representing a predicted arrangement to represent overlaps of the first regions and the second regions. In some variants, the barcode decoder 315 decodes the first subset of barcodes during a first decoding pass, and only uses image data associated with the first subset of barcodes to compute the horizontal and vertical projections. For example, the barcode decoder 315 can assign a fixed value of one, or some other value, to the pixels that correspond to each of the barcodes decoded during the first decoding and assign a fixed value of zero to the rest of the pixels, and then compute the horizontal and vertical projections across these assigned pixel values. Alternatively, the barcode decoder 315 can assign a fixed value of one, or some other value, to the pixels that correspond to the center of each of the barcodes decoded during the first decoding and assign a fixed value of zero to the rest of the pixels, and then compute the horizontal and vertical projections across these assigned pixel values. Still further, the barcode decoder 315 can assign a variable value (e.g., based upon a computed contrast) to the pixels that correspond to each of the barcodes decoded during the first decoding and assign a fixed value of zero to the rest of the pixels, and then compute the horizontal and vertical projections across these assigned pixel values. Such methods may be based upon the original image data, and/or a reduced-scale version of the image data.

Example barcode decoders 315 include a programmable processor, programmable controller, graphics processing unit (GPU), digital signal processor (DSP), etc. capable of executing instructions to, for example, implement operations of the example methods described herein. Additionally and/or alternatively, the barcode decoder 315 may include one or more logic circuits capable of, for example, implementing operations of the example methods described herein without executing software or instructions.

The example system 300 includes one or more example processors 320 to generally control the system 300, and to provide the decoded payloads of barcodes decoded by the barcode decoder 315 to, for example, a host system via a communication interface 325.

Example processors 320 include a programmable processor, programmable controller, GPU, DSP, etc. capable of executing instructions to, for example, implement operations of the example methods described herein. Additionally and/or alternatively, the processor 320 may include one or more logic circuits capable of, for example, implementing operations of the example methods described herein without executing software or instructions. In some examples, the processor 320 and the barcode decoder 315 are implemented by the same device. An example logic circuit 1400 that may be used to implement the system 300 is discussed below in connection with FIG. 14.

Figure 6:
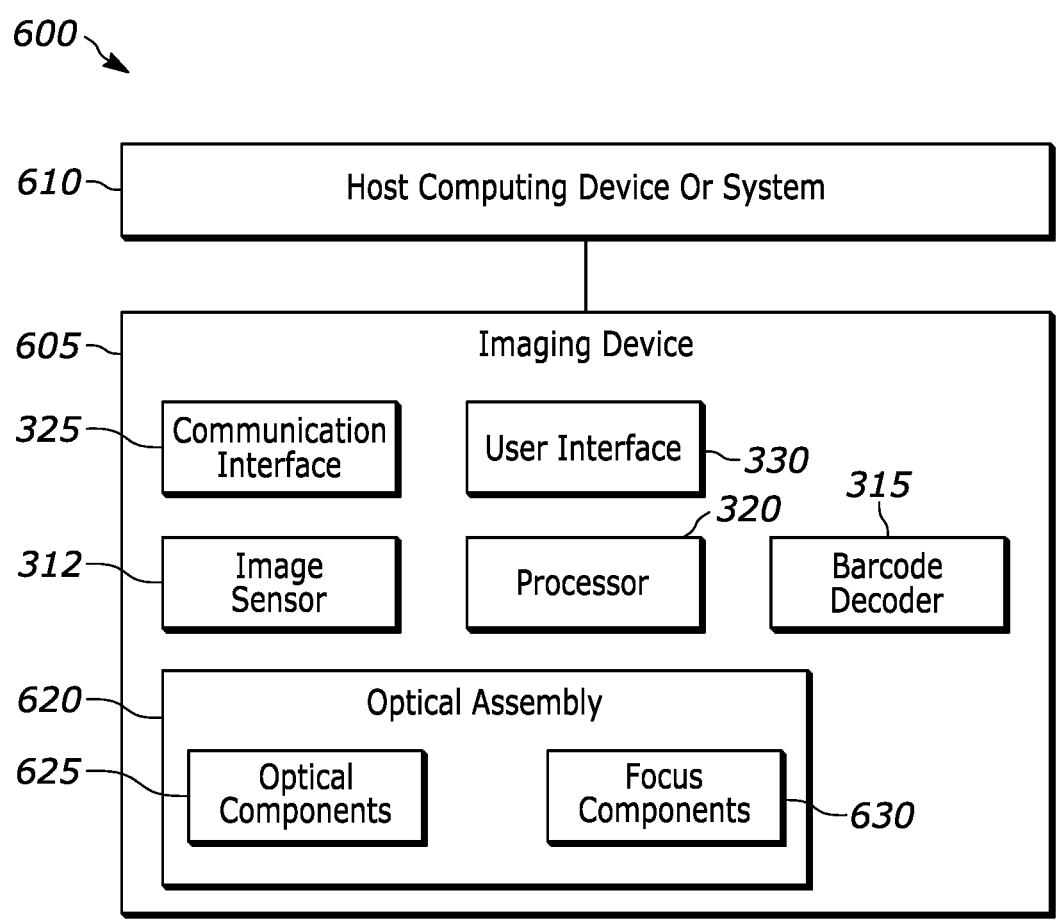
FIG. 6 is a block diagram of an example imaging device that may be used to implement the example system of FIG. 3 for locating and decoding an arranged plurality of barcodes in an image, in accordance with embodiments of the disclosure.

FIG. 6 is a block diagram of an example system 600 having an imaging device 605 that may be configured to implement the system 300 of FIG. 3, and provides the payload of decoded barcodes, indicia, direct product markings (DPMs), etc. to a host computing device or system 610. The imaging device 605 may be, for example, a handheld scanner that may operate in a handheld and/or handsfree mode, a bioptic scanner, a machine vision system, a slot scanner, or the like that are configured to decode barcodes and provide the payload of the decoded barcodes to the host computing device or system 610 via, for example, the communication interface 325. The imaging device 605 may also be, for example, a general-purpose computing device (e.g., a computer, a laptop, a mobile device such as a mobile phone, a tablet, etc.), a headset or other wearable device (e.g., an augmented reality headset, etc.), or any other type of computing device or system having a communication interface and a camera for capturing images, and configurable to process such images for determining barcode decoding parameters for a plurality of barcodes in an image, and locating and decoding the barcodes. An example logic circuit 1400 that may be used to implement the imaging device 605 is discussed below in connection with FIG. 14. The host computing device or system 610 may be a point-of-sale (POS) station, a point-of-transaction station, an inventory management system, etc.

The example imaging device 605 includes the image sensor(s) 312 having a plurality of photosensitive elements to capture image data representing images of an environment in which the imaging device 605 is operating that falls within a FOV of the imaging device 605, the processor 320, and the barcode decoder 315 of FIG. 3. In some examples, the processor 320 of FIG. 6 controls the overall operation of the imaging device 605. For example, the processor 320 may control the image sensor 312 to capture one or more images; control the barcode decoder 315 to locate and decode an arranged plurality of barcodes in a captured image; provide barcode payloads of decoded barcodes to the host computing device or system 710; execute an operating system; provide one or more user interfaces 330; respond to user inputs received via the communication interface 325 and/or the user interface 330; execute one or more applications on behalf of a user; etc. In some examples, the processor 320 and the barcode decoder 315 are implemented by the same device.

The imaging device 605 includes an optical assembly 620 to form images of an environment in a FOV on a surface of the image sensor 312. The optical assembly 620 may include any number and/or type(s) of optical elements and/or components 625 including, for example, one or more lenses, filters, focus motors, apertures, lens holder, liquid lenses, or any other components and/or optical elements.

In some examples, the optical assembly 620 includes any number and/or type(s) of focus components 630 (e.g., motors, liquid lenses, etc.) to focus the optical assembly 620 on, for example, a barcode. In some examples, some of the focus components 630 (e.g., an autofocus controller) are implemented by the processor 320. Alternatively, the optical assembly 620 is a fixed-focus optical assembly.

While not shown in FIG. 6 for clarity of illustration, the imaging device 605 may include an aiming pattern generator configured to provide an illuminated aiming pattern to assist a user in directing the imaging device 605 toward a barcode of interest, and/or an illumination generator to emit light in a FOV to, for example, facilitate autofocus and/or improve the quality of image data captured by the image sensor 312.

Figure 7:
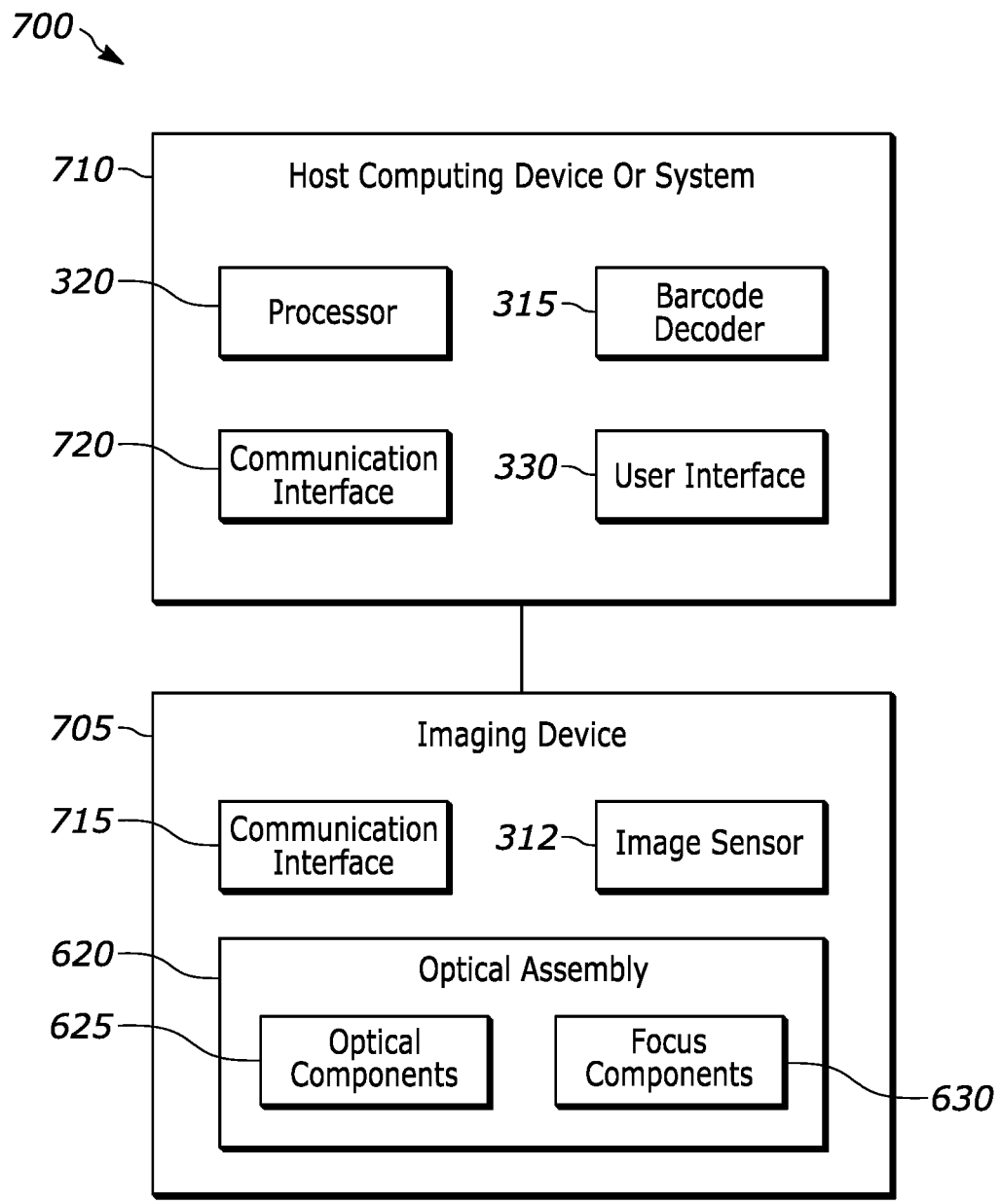
FIG. 7 is a block diagram of an example system having a computing device and an imaging device that may be used to implement the example system of FIG. 3 for locating and decoding an arranged plurality of barcodes in an image, in accordance with embodiments of the disclosure.

FIG. 7 is a block diagram of another example system 700 having an imaging device 705 for capturing and providing images; and a host computing device or system 710 for locating and decoding an arranged plurality of barcodes in a captured image. The imaging device 705 and the host computing device or system 710 can together implement the system 300 of FIG. 3. The imaging device 705 may provide captured image data to the host computing device or system 710 via respective communication interfaces 715 and 720. The imaging device 705 may be, for example, a handheld scanner that may operate in a handheld and/or handsfree mode, a bioptic scanner, a machine vision system, a slot scanner, or the like that are configured to provide captured images to the host computing device or system 710. The imaging device 705 may also be, for example, a general-purpose computing device (e.g., a computer, a laptop, a mobile device such as a mobile phone, a tablet, etc., a headset or other wearable device (e.g., an augmented reality headset, etc.), or any other type of computing device or system) having a communication interface and a camera for capturing images, and configurable to provide images to the host computing device or system 710. As shown in FIG. 7, the imaging device 705 includes the image sensor(s) 312 of FIG. 3.

The example host computing device or system 710 includes the processor 320 and the barcode decoder 315 of FIG. 3. The processor 320 of FIG. 7 controls the overall operation of the host computing device or system 710. For example, the processor 320 may control the reception of captured images from the imaging device 705; control the barcode decoder 315 to locate and decode an arranged plurality of barcodes in a captured image; execute an operating system; provide one or more user interfaces 330; respond to user inputs received via the user interface 330; execute one or more applications on behalf of a user; etc. The host computing device or system 610 may be a point-of-sale (POS) station, a point-of-transaction station, an inventory management system, etc. An example logic circuit 1400 that may be used to implement the imaging device 705 and/or the host computing device or system 710 is discussed below in connection with FIG. 14. In some examples, the processor 320 and the barcode decoder 315 are implemented by the same device.

Figure 8:
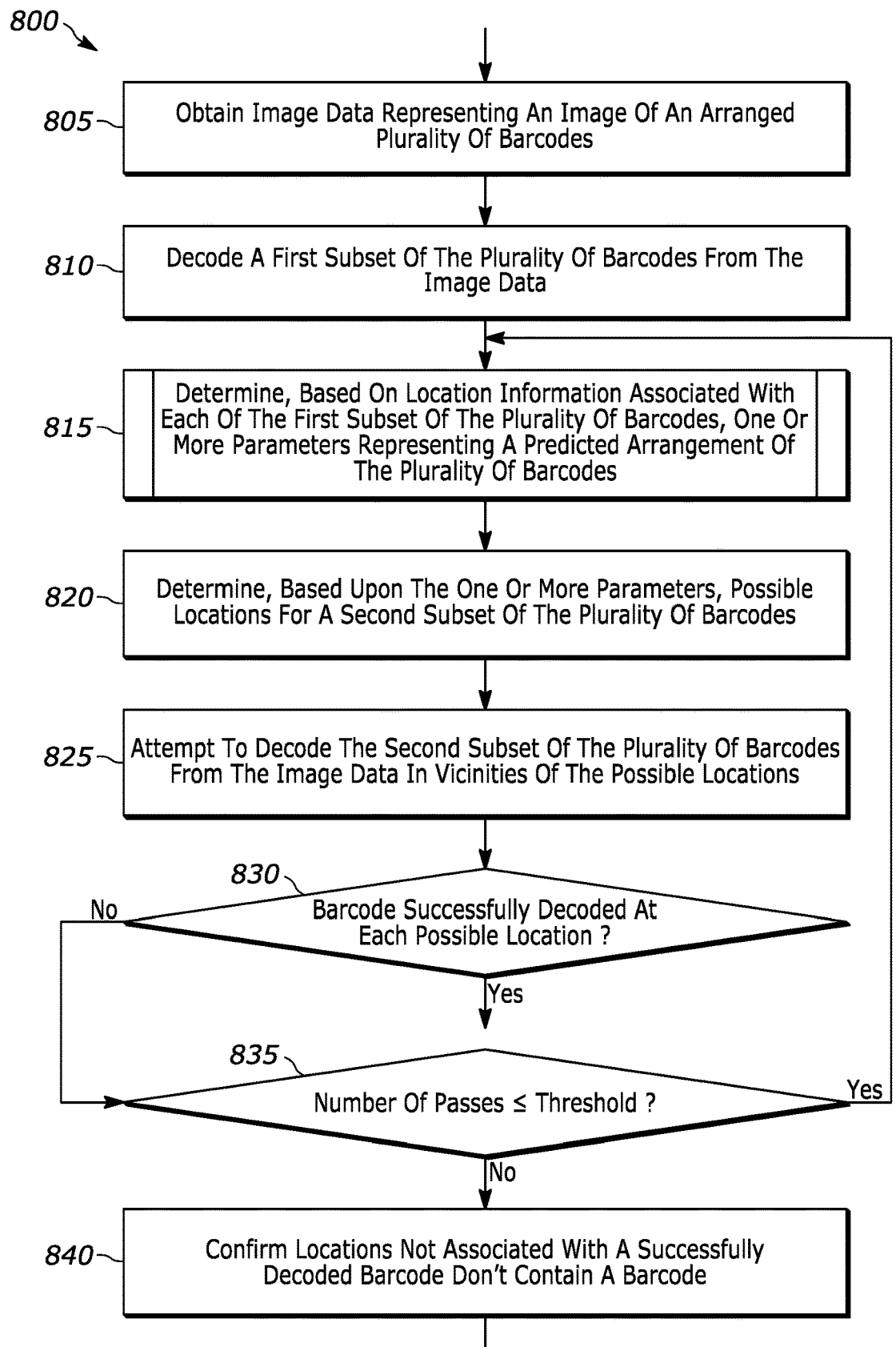
FIG. 8 is a flowchart representative of an example method, hardware logic, machine-readable instructions, or software for locating and decoding an arranged plurality of barcodes in an image, in accordance with embodiments of the disclosure.

FIG. 8 is a flowchart 800 representative of example processes, methods, software, machine-readable instructions, etc. that may be implemented by the system 300 of FIG. 3, the imaging device 605 of FIG. 6, and/or the system 700 of FIG. 7 to locate and decode an arranged plurality of barcodes appearing in an image. Any or all of the blocks of FIG. 8 may be an executable program or portion(s) of an executable program embodied in software and/or machine-readable instructions stored on a non-transitory, machine-readable storage medium for execution by one or more processors such as the processor 1402 of FIG. 14. Additionally and/or alternatively, any or all of the blocks of FIG. 8 may be implemented by one or more hardware circuits structured to perform the corresponding operation(s) without executing software or instructions.

The flowchart 800 of FIG. 8 begins at block 805 with a barcode decoder, such as the barcode decoder 315, obtaining image data representing an image 310 of an environment in a FOV in which a plurality of barcodes appears. The image data may be obtained, directly or indirectly, from the image sensor 312 and/or from the imaging device 705.

The example barcode decoder 315, during a first decoding pass prioritized for speed over read rate, for example, decodes a first subset of the plurality of barcodes from the image data (block 810). In some examples, the barcode decoder 315 attempts to decode all of the barcodes, but only successfully decodes the first subset. In some examples, the barcode decoder 315 identifies the first subset of barcodes as a subset of the barcodes that are spread out in the image. In some examples, the barcode decoder 315 attempts to decode a pre-determined number of barcodes (e.g., five to ten) sufficient to determine, identify, or approximate a predicted arrangement of the plurality of barcodes. The barcode decoder 315 can identify possible barcode locations for the first decoding phase using any number and/or type(s) of method(s), such as those described above in connection with FIG. 3.

The barcode decoder 315 determines, based upon location information associated with each of the first subset of barcodes successfully decoded during the first decoding pass, one or more parameters representing a predicted arrangement of the plurality of barcodes in the image 310 (block 815). The one or more parameters can be determined using the flowchart 900 of FIG. 9, and/or the flowchart 1000 of FIG. 10, for example.

The barcode decoder 315 determines, based upon the one or more parameters, possible locations for the rest of the barcodes that were not successfully decoded during the first decoding pass (i.e., for a second subset of the barcodes) (block 820), and attempts to decode the second subset of barcodes from image data in vicinities of the possible locations (block 825). During the second decoding pass, the barcode decoder 315 uses a decoding algorithm prioritized for read rate over speed, in some examples. In some examples, a set of barcode decoding parameters used during the first decoding pass is used first during the second decoding pass to further accelerate the locating and decoding of barcodes.

If a barcode is successfully decoded at each possible location (block 830), control exits from the example flowchart 800. Otherwise, if a number of attempted decoding passes satisfies an iteration criteria (e.g., less than or equal to a pre-determined threshold) (block 835), control returns to block 815 to determine, based upon location information associated with each of the barcodes successfully decoded during the first decoding pass or the second decoding pass, one or more parameters representing an updated predicted arrangement of the plurality of barcodes in the image 310 (block 815).

Otherwise, if a number of attempted decoding passes does not a criteria (e.g., greater than a pre-determined threshold) (block 835), the barcode decoder 315 confirms that possible locations not associated with a successfully decoded barcode don't contain a barcode (block 840), and control exits from the flowchart 800.

Figure 9:
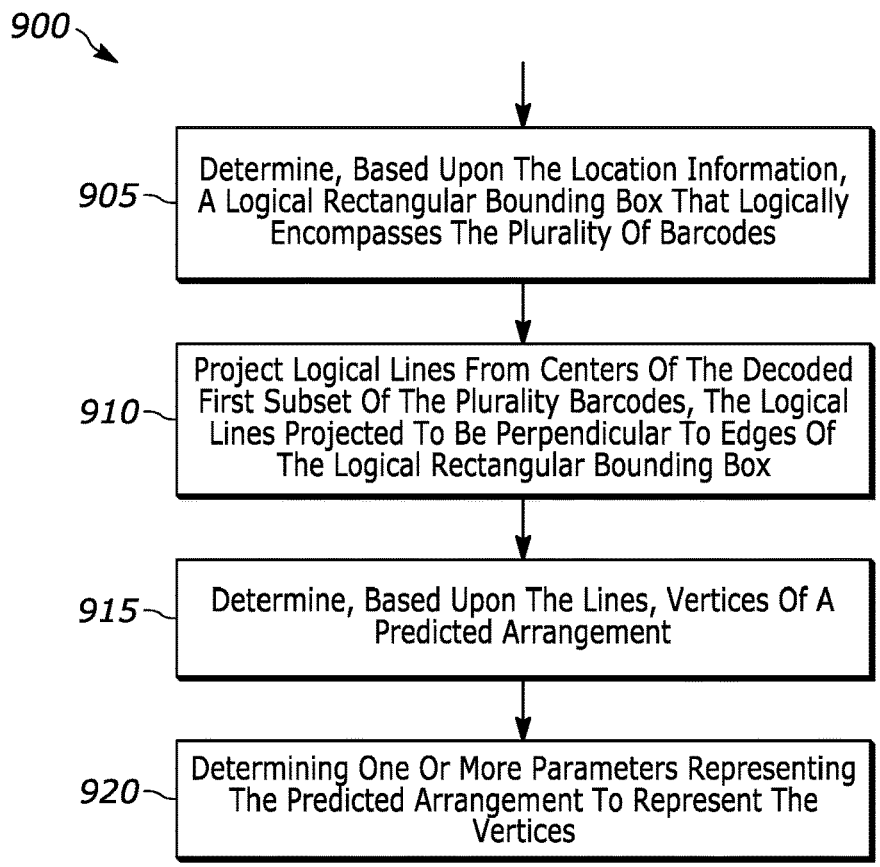
FIG. 9 is a flowchart representative of an example method, hardware logic, machine-readable instructions, or software for identifying an arrangement of a plurality of barcodes, in accordance with embodiments of the disclosure.

FIG. 9 is a flowchart 900 representative of example processes, methods, software, machine-readable instructions, etc. that may be implemented by the system 300 of FIG. 3, the imaging device 605 of FIG. 6, and/or the system 700 of FIG. 7 to determine an arrangement of a plurality of barcodes appearing in an image at block 815 of FIG. 8, for example. Any or all of the blocks of FIG. 9 may be an executable program or portion(s) of an executable program embodied in software and/or machine-readable instructions stored on a non-transitory, machine-readable storage medium for execution by one or more processors such as the processor 1402 of FIG. 14. Additionally and/or alternatively, any or all of the blocks of FIG. 9 may be implemented by one or more hardware circuits structured to perform the corresponding operation(s) without executing software or instructions.

The flowchart 900 of FIG. 9 begins at block 905 with a barcode decoder, such as the barcode decoder 315 defining a logical rectangular bounding box that logically encompasses the plurality of barcodes, e.g., as shown in FIG. 5 (block 905). The barcode decoder 315 projects horizontal logical lines and vertical logical lines from centers of the decoded subset of barcodes, such that the logical lines are projected to be substantially perpendicular to edges of the logical rectangular bounding box (block 910). When there are multiple projecting lines associated with different decoded barcodes within a same row or column of the grid, the barcode decoder 315 can combine their lines into an aggregate line that represents, for example, a mean or average line. The barcode decoder 315 determines, based upon intersections of the logical lines and/or the aggregate lines, vertices of the arrangement (block 915), and determines the one or more parameters representing a predicted arrangement of the plurality of barcodes to represent the vertices (block 920). Control then exits from the flowchart 900.

Figure 10:
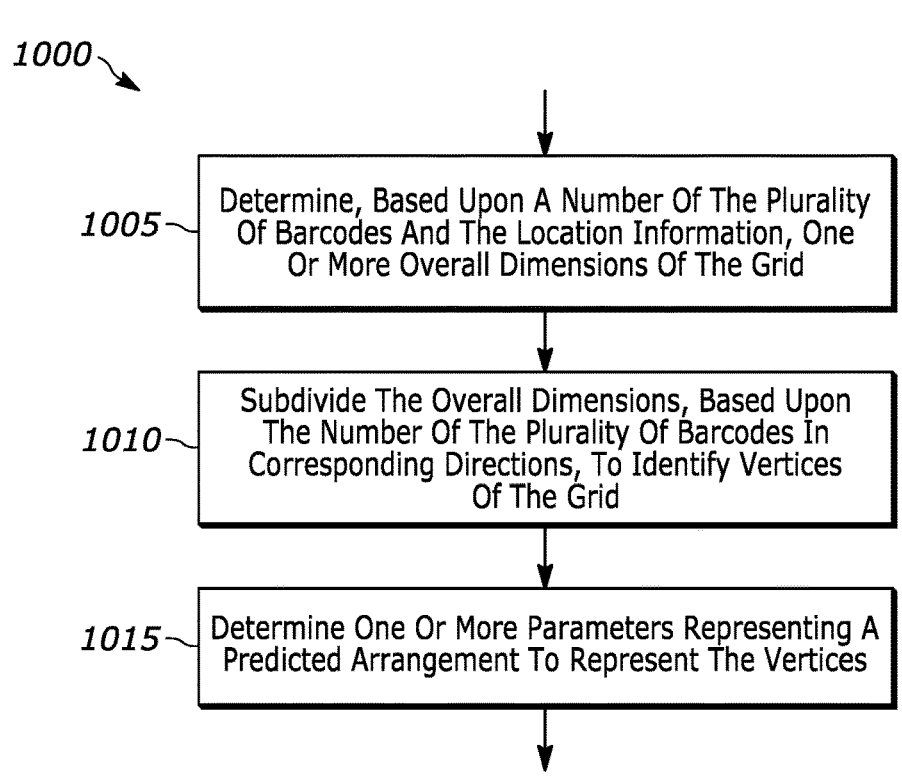
FIG. 10 is a flowchart representative of another example method, hardware logic, machine-readable instructions, or software for identifying an arrangement of a plurality of barcodes, in accordance with embodiments of the disclosure.

FIG. 10 is a flowchart 1000 representative of example processes, methods, software, machine-readable instructions, etc. that may be implemented by the system 300 of FIG. 3, the imaging device 605 of FIG. 6, and/or the system 700 of FIG. 7 to determine an arrangement of a plurality of barcodes appearing in an image at block 815 of FIG. 8, for example. Any or all of the blocks of FIG. 10 may be an executable program or portion(s) of an executable program embodied in software and/or machine-readable instructions stored on a non-transitory, machine-readable storage medium for execution by one or more processors such as the processor 1402 of FIG. 14. Additionally and/or alternatively, any or all of the blocks of FIG. 10 may be implemented by one or more hardware circuits structured to perform the corresponding operation(s) without executing software or instructions.

The flowchart 1000 of FIG. 10 begins at block 1005 with a barcode decoder, such as the barcode decoder 315, determining, based upon the number of barcodes in the arrangement, and the location information associated with each of the barcodes successfully decoded during the first pass location, one or more overall dimensions of the grid (e.g., horizontally and vertically) (block 1005). The barcode decoder 315 subdivides the one or more dimensions of the grid, based upon the number of barcodes in corresponding directions, to identify vertices of the grid (block 1010), and determines one or more parameters representing a predicted arrangement of the plurality of barcodes to represent locations of the vertices (block 1015). The number of barcodes in the arrangement can be known a priori, and/or can be determined based on the barcodes decoded during the first decoding pass.

Figure 11:
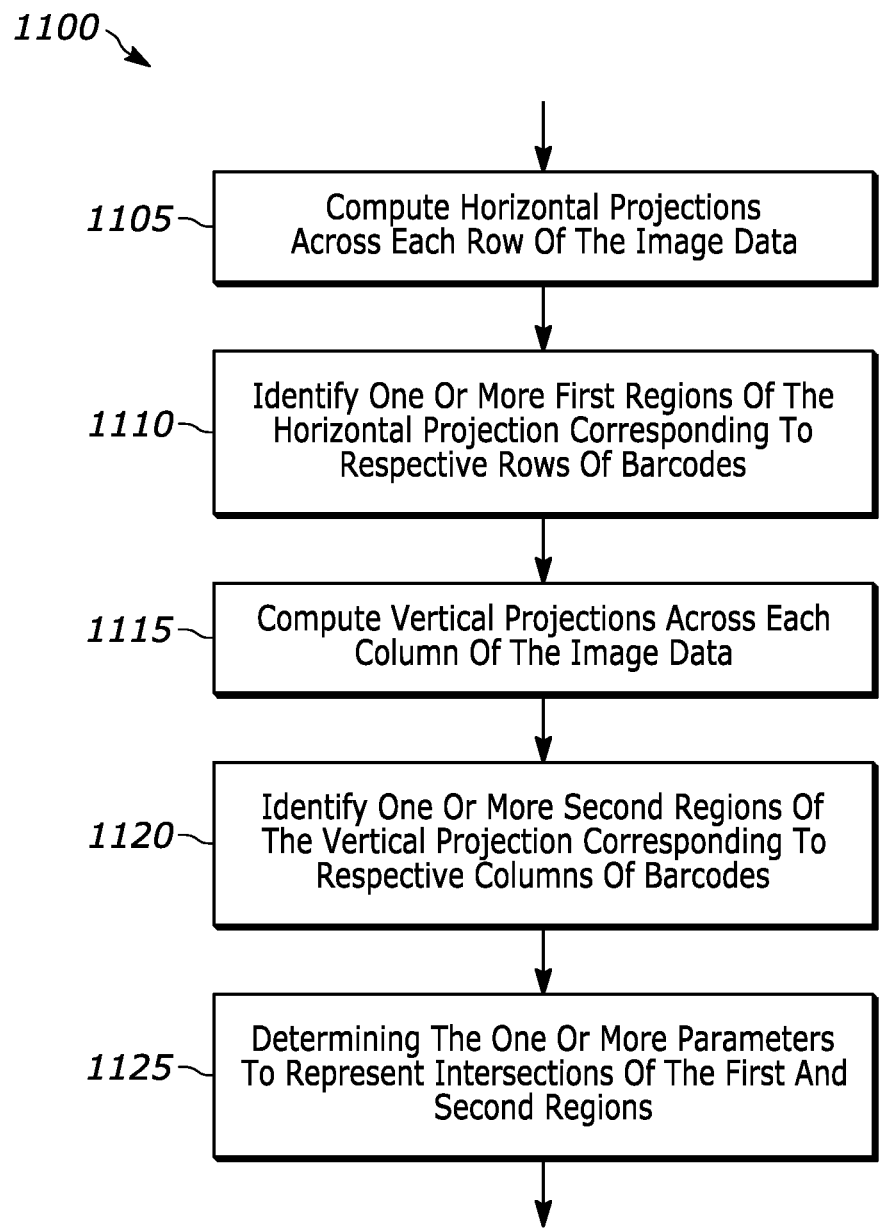
FIG. 11 is a flowchart representative of another example method, hardware logic, machine-readable instructions, or software for identifying an arrangement of a plurality of barcodes, in accordance with embodiments of the disclosure.

FIG. 11 is a flowchart 1100 representative of example processes, methods, software, machine-readable instructions, etc. that may be implemented by the system 300 of FIG. 3, the imaging device 605 of FIG. 6, and/or the system 700 of FIG. 7 to determine an arrangement of a plurality of barcodes appearing in an image. The flowchart 1100 may be implemented instead of blocks 810 and 815 in FIG. 8, for example. Any or all of the blocks of FIG. 11 may be an executable program or portion(s) of an executable program embodied in software and/or machine-readable instructions stored on a non-transitory, machine-readable storage medium for execution by one or more processors such as the processor 1402 of FIG. 14. Additionally and/or alternatively, any or all of the blocks of FIG. 11 may be implemented by one or more hardware circuits structured to perform the corresponding operation(s) without executing software or instructions.

Figure 12:
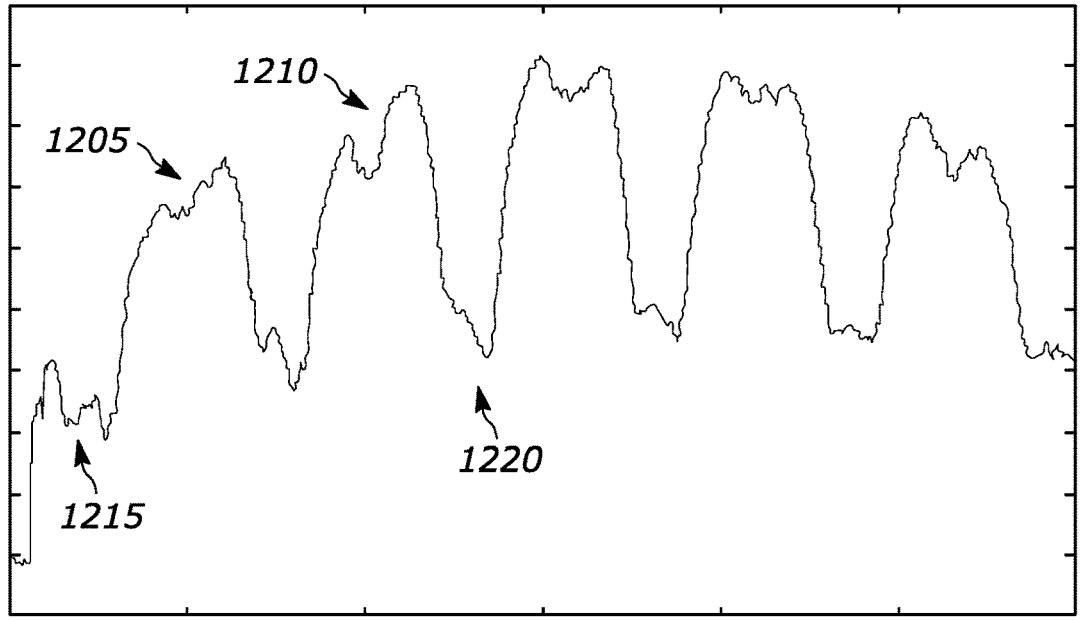
FIG. 12 is a graph of an example horizontal projection of the image of FIG. 2.

The flowchart 1100 of FIG. 11 begins at block 1105 with a barcode decoder, such as the barcode decoder 315, computing a horizontal projection of the image data for a captured image 310 by computing a plurality of sums across respective rows of the image data, for example (block 1105). FIG. 12 is a graph 1200 representing a horizontal projection of the example image 200 of FIG. 2. Because the barcodes 210-212 of FIG. 2 are more dense (e.g., darker) than other portions of the image 200, regions of the horizontal projection of FIG. 12 that correspond to the barcodes 210-212 (two of which are designated at reference numeral 1205 and 1210) have larger values than other regions that do not correspond to barcodes (two of which are designated at reference numeral 1215 and 1220). The barcode decoder 315 identifies the regions 1205, 1210 of the horizontal projection corresponding to rows of barcodes (i.e., first regions) by comparing the horizontal projection to a threshold, for example (block 1110).

Figure 13:
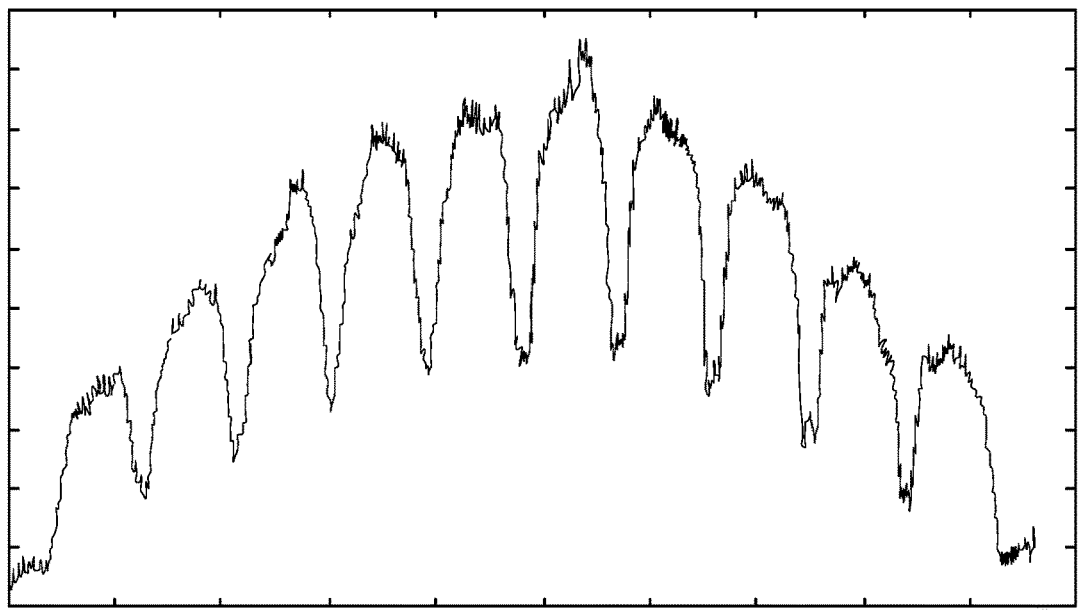
FIG. 13 is a graph of an example vertical projection of the image of FIG. 2.

The barcode decoder 315 computes a vertical projection of the image data by computing a plurality of sums across respective columns of the image data, for example (block 1115). FIG. 13 is a graph 1300 representing a vertical projection of the example image 200 of FIG. 2. FIG. 13 contains regions similar to those described above in connection with FIG. 12 that can be used to identify regions of the vertical projection associate with columns of barcodes in the image 200. The barcode decoder 315 identifies the regions of the vertical projection corresponding to columns of barcodes (i.e., second regions) by comparing the vertical projection to a threshold, for example (block 1120).

The barcode decoder 315 determines one or more parameters representing a predicted arrangement of the plurality of barcodes to represent intersections and/or overlaps of the first and second regions. For example, the barcode decoder 315 may identify intersections of centers of the first and second regions as vertices of a grid, which are represented by the one or more parameters. Additionally and/or alternatively, the one or more parameters may represent regions of the image corresponding to overlaps of the first and second regions.

Figure 14:
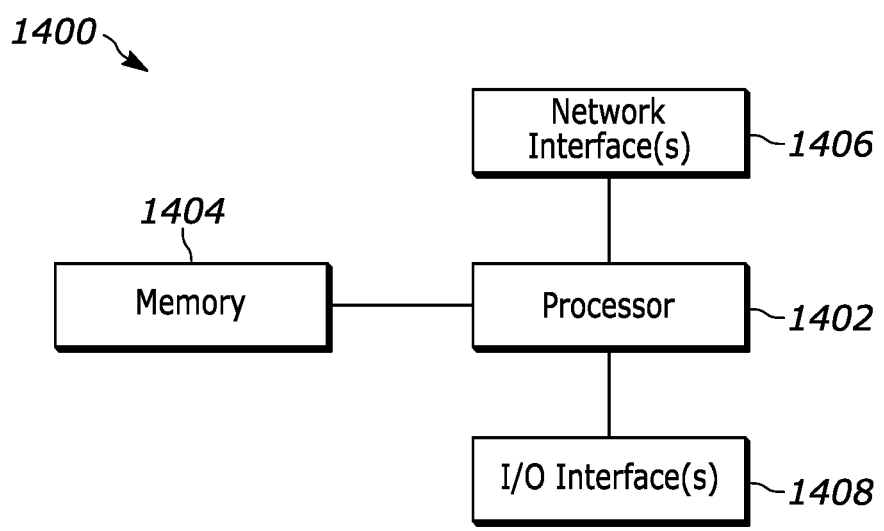
FIG. 14 is a block diagram of an example logic circuit for implementing example methods and/or operations described herein.

FIG. 14 is a block diagram representative of an example logic circuit capable of implementing, for example, one or more components of the example system 300 of FIG. 3, the example imaging device 605 of FIG. 6, and/or the example system 700 of FIG. 7 for locating and decoding an arranged plurality of barcodes appearing in an image. The example logic circuit of FIG. 14 is a processing platform 1400 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 1400 of FIG. 14 includes a processor 1402 such as, for example, one or more microprocessors, controllers, and/or any suitable type of processor. The example processing platform 1400 of FIG. 14 includes memory (e.g., volatile memory, non-volatile memory) 1404 accessible by the processor 1402 (e.g., via a memory controller, not shown for clarity of illustration). The example processor 1402 interacts with the memory 1404 to obtain, for example, machine-readable instructions stored in the memory 1404 corresponding to, for example, the operations represented by the flowcharts of this disclosure. Additionally or alternatively, machine-readable instructions corresponding to the example operations described herein may be stored on one or more removable media (e.g., a compact disc (CD), a digital versatile disc (DVD), removable flash memory, etc.) that may be coupled to the processing platform 1400 to provide access to the machine-readable instructions stored thereon.

The processing platform 1400 of FIG. 14 includes one or more communication interfaces such as, for example, one or more network interfaces 1406, and/or one or more input/output (I/O) interfaces 1408. The communication interface(s) enable the processing platform 1400 of FIG. 14 to communicate with, for example, another device (e.g., the host computing device or system 610), system, host system (e.g., a POS system, a point-of-transaction system, an inventory management system), datastore, database, and/or any other machine.

The example processing platform 1400 of FIG. 14 also includes the network interface(s) 1406 to enable communication with other machines via, for example, one or more networks. The example network interface 1406 includes any suitable type of communication interface(s) (e.g., wired and/or wireless interfaces) configured to operate in accordance with any suitable protocol(s).

The example, processing platform 1400 of FIG. 14 also includes the input/output (I/O) interface(s) 1408 to enable receipt of user input and communication of output data to the user.

The above description refers to a block diagram of the accompanying drawings. Alternative implementations of the example represented by the block diagram includes one or more additional or alternative elements, processes, and/or devices. Additionally or alternatively, one or more of the example blocks of the diagram may be combined, divided, re-arranged, or omitted. Components represented by the blocks of the diagram are implemented by hardware, software, firmware, and/or any combination of hardware, software, and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged, or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 50%, in another embodiment within 14%, in another embodiment within 5% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Use of "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise. A device or structure that is "configured" in a certain way is configured in at least that way, but may also be configured in ways that are not listed. Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The claims are:

1. A method, comprising:
    obtaining, from an image sensor, image data representing an image of an environment appearing within a field of view of an imaging device that includes the image sensor, wherein an arranged plurality of barcodes appear in the image;
    decoding a first subset of the plurality of barcodes from the image data, the first subset of the plurality of barcodes includes at least two barcodes;
    determining, based upon location information associated with each of the decoded first subset of the plurality barcodes, one or more parameters representing a predicted arrangement of the plurality of barcodes in the image;
    determining, based upon the one or more parameters, possible locations for respective ones of a second subset of the plurality of barcodes, wherein the second subset excludes the first subset;
    attempting to decode the second subset of the plurality of barcodes from the image data in vicinities of the respective possible locations; and
    transmitting, to a host, respective payload data associated with each of the first subset of the plurality of barcodes and decoded ones of the second subset of the plurality of barcodes.

2. The method of claim 1, wherein the plurality of barcodes are on respective ones of a plurality of objects in the environment, and wherein the possible locations represent possible locations of the plurality of objects.

3. The method of claim 1, wherein attempting to decode the second subset of the plurality of barcodes uses first a set of decoding parameters used to successfully decode one or more of the first subset of the plurality of barcodes.

4. The method of claim 1, further comprising:
    using a first barcode decoding algorithm prioritized for speed over read rate to decode the first subset of the plurality of barcodes; and
    using a second barcode decoding algorithm prioritized for read rate over speed to attempt to decode the second subset of the plurality of barcodes.

5. The method of claim 1, further comprising:
    determining, based upon the location information associated with each of the decoded first subset of the plurality of barcodes and second location information associated with each successfully decoded barcode of the second subset of the plurality of barcodes, second one or more parameters representing a second predicted arrangement of the plurality of barcodes in the image;
    determining, based upon the second one or more parameters, estimated second possible locations for respective ones of a third subset of the plurality of barcodes; and attempting to decode the third subset of the plurality of barcodes from the image data in vicinities of the second possible locations.

6. The method of claim 1, further comprising:
identifying a subset of the possible locations at which a barcode was not successfully decoded; and
processing image data associated with each of the subset of the possible locations to confirm that a barcode is not present at or near the subset of the respective estimated locations.

7. The method of claim 6, wherein processing the image data associated with each of the subset of the possible locations to confirm that a barcode is not present comprises:
attempting to decode a barcode using image data further away from each of the subset of the possible locations with a substantially exhaustive set of barcode decoding parameters.

8. The method of claim 1, wherein the arrangement is based upon a rectangular grid.

9. The method of claim 1, wherein the arrangement is based upon a rectangular grid, and wherein determining, based upon the location information, the one or more parameters comprises:
determining, based upon the location information, a logical rectangular bounding box that logically encompasses the plurality of barcodes;
projecting logical lines from centers of the decoded first subset of the plurality of barcodes, the logical lines projected to be substantially perpendicular to edges of the logical rectangular bounding box; and
determining the one or more parameters to represent intersections of the logical lines.

10. The method of claim 1, wherein the one or more parameters represent possible locations of the plurality of barcodes in the arrangement, and wherein determining the possible locations for respective ones of the second subset of the plurality of barcodes comprises:
identifying a subset of the possible locations that excludes locations associated with the decoded first subset of the plurality of barcodes; and
determining the possible locations to represent the locations of the subset of possible locations.

11. The method of claim 1, wherein the arrangement is based upon a rectangular grid, and wherein determining, based upon the location information, the one or more parameters comprises:
determining, based upon a number of the plurality of barcodes and the location information, one or more dimensions of the grid;
subdividing the grid, based upon the number of the plurality of barcodes, to identify vertices of the grid; and
determining the one or more parameters to represent locations of the vertices.

12. An apparatus, comprising:
an interface to receive, from an image sensor, image data representing an image of an environment appearing within a field of view of the image sensor, wherein an arranged plurality of barcodes appear in the image;
a barcode decoder configured to:
decode a first subset of the plurality of barcodes from the image data, the first subset of the plurality of barcodes includes at least two barcodes;
determine, based upon location information associated with each of the decoded first subset of the plurality of barcodes, one or more parameters representing a predicted arrangement of the plurality of barcodes in the image;
determine, based upon the one or more parameters, possible locations for respective ones of a second subset of the plurality of barcodes, wherein the second subset excludes the first subset; and
attempt to decode the second subset of the plurality of barcodes from the image data in vicinities of the respective possible locations; and
a communication interface configured to transmit, to a host, respective payload data associated with each of the first subset of the plurality of barcodes and decoded ones of the second subset of the plurality of barcodes.

13. The apparatus of claim 12, wherein the plurality of barcodes are on respective ones of a plurality of objects in the environment, and wherein the possible locations represent possible locations of the plurality of objects.

14. The apparatus of claim 12, wherein the barcode decoder is configured to:
use a first barcode decoding algorithm prioritized for speed over read rate to decode the first subset of the plurality of barcodes; and
use a second barcode decoding algorithm prioritized for read rate over speed to attempt to decode the second subset of the plurality of barcodes.

15. The apparatus of claim 3, wherein the arrangement is based upon a rectangular grid.

16. The apparatus of claim 12, wherein the arrangement is based upon a rectangular grid, and wherein the barcode decoder is configured to determine, based upon the location information, the one or more parameters by:
determining, based upon the location information, a logical rectangular bounding box that logically encompasses the plurality of barcodes; and
projecting logical lines from centers of the decoded first subset of the plurality of barcodes, the logical lines projected to be substantially perpendicular to edges of the logical rectangular bounding box; and
determining the one or more parameters to represent intersections of the logical lines.

17. A non-transitory, computer-readable, storage medium storing computer-readable instructions that, when executed by one or more processors, cause a barcode decoder to:
obtain, from an image sensor, imaging data representing an image of an environment appearing within a field of view of the image sensor, wherein an arranged plurality of barcodes appear in the image;
decode a first subset of the plurality of barcodes from the image data, the first subset of the plurality of barcodes includes at least two barcodes;
determine, based upon location information associated with each of the decoded first subset of the plurality of barcodes, one or more parameters representing a predicted arrangement of the plurality of barcodes in the image;
determine, based upon the one or more parameters, possible locations for respective ones of a second subset of the plurality of barcodes, wherein the second subset excludes the first subset;
attempt to decode the second subset of the plurality of barcodes from the image data in vicinities of the respective possible locations; and
transmit, to a host, respective payload data associated with each of the first subset of the plurality of barcodes and decoded ones of the second subset of the plurality of barcodes.

18. The storage medium of claim 17, wherein the plurality of barcodes are on respective ones of a plurality of objects in the environment, and wherein the possible locations represent possible locations of the plurality of objects.

19. The storage medium of claim 17, wherein the instructions, when executed by one or more processors, cause the barcode decoder to:
- use a first barcode decoding algorithm prioritized for speed over read rate to decode the first subset of the plurality of barcodes; and
- use a second barcode decoding algorithm prioritized for read rate over speed to attempt to decode the second subset of the plurality of barcodes.

20. The storage medium of claim 1, wherein the arrangement is based upon a rectangular grid, and wherein the instructions, when executed by one or more processors, cause the barcode decoder to determine, based upon the location information, the one or more parameters by:
- determining, based upon the location information, a logical rectangular bounding box that logically encompasses the plurality of barcodes;
- projecting logical lines from centers of the decoded first subset of the plurality of barcodes, the logical lines projected to be substantially perpendicular to edges of the logical rectangular bounding box; and
- determining the one or more parameters to represent intersections of the logical lines.

* * * * *